US005816731A

United States Patent [19]

Howard

[11] Patent Number: 5,816,731

[45] Date of Patent: Oct. 6, 1998

[54] SEALED SELF-ADJUSTING BEARING ASSEMBLY

[76] Inventor: Durrell U. Howard, 306 Krameria Dr., San Francisco, Tex. 78213

[21] Appl. No.: 768,582

[22] Filed: Dec. 18, 1996

[51] Int. Cl.[6] .......... F16C 11/00

[52] U.S. Cl. .......... 403/120; 403/145; 403/137; 403/132

[58] Field of Search .......... 403/145, 144, 403/138, 137, 135, 132, 129, 122, 120

[56] References Cited

U.S. PATENT DOCUMENTS

| | | | |
|---|---|---|---|
| 88,863 | 4/1869 | Finley . | |
| 1,044,468 | 11/1912 | Kirk, Jr. . | |
| 1,199,048 | 9/1916 | Breeze . | |
| 1,824,271 | 9/1931 | Hufferd . | |
| 1,872,099 | 9/1932 | Urschel . | |
| 2,003,539 | 6/1935 | Hufferd . | |
| 2,115,629 | 4/1938 | Gurley . | |
| 2,396,151 | 3/1946 | Brenner et al. | 403/145 X |
| 2,537,552 | 1/1951 | Schlegal, Sr. . | |
| 2,779,603 | 1/1957 | McRae . | |
| 2,883,131 | 4/1959 | McNally . | |
| 2,993,717 | 7/1961 | Gottschald . | |
| 3,128,110 | 4/1964 | Herbenar et al. | 403/138 |
| 3,337,246 | 8/1967 | Moskovitz . | |
| 3,890,052 | 6/1975 | Herbenar et al. | 403/138 X |
| 3,950,006 | 4/1976 | Wood, Jr. . | |
| 4,129,394 | 12/1978 | Eichinger et al. . | |
| 4,995,755 | 2/1991 | Hyodo et al. . | |
| 5,011,320 | 4/1991 | Love et al. . | |
| 5,085,520 | 2/1992 | Fujan . | |
| 5,116,159 | 5/1992 | Kern, Jr. et al. . | |
| 5,149,067 | 9/1992 | Fruhauf et al. . | |
| 5,154,530 | 10/1992 | Dresselhouse . | |
| 5,159,742 | 11/1992 | Winter . | |
| 5,205,666 | 4/1993 | Hollis . | |
| 5,435,652 | 7/1995 | Howard . | |

*Primary Examiner*—Brian K. Green
*Assistant Examiner*—William L. Miller
*Attorney, Agent, or Firm*—Pollock, Vande Sande & Priddy

[57] ABSTRACT

A self-adjusting bearing assembly comprising a ball member, a connector member, and a bearing seat component having at least two seat members arranged to receive the ball member therebetween. The ball member has a shaped segment providing an outer bearing surface, and the seat members include correspondingly shaped inner bearing surfaces for engaging the outer bearing surface of the ball member. A slack removal mechanism is provided to urge a movable one of the seat members toward the ball member and may comprise a pressure chamber having a wall formed by a resilient diaphram positioned adjacent a pressure surface of the movable seat member, and a fitting for pressurizing this chamber with a fluid. The assembly may include a second fitting for feeding lubricant from the pressure chamber to the bearing surfaces. Optionally, a screw member may be provided for exerting an adjustable mechanical force to urge the movable seat member against the ball member.

25 Claims, 3 Drawing Sheets

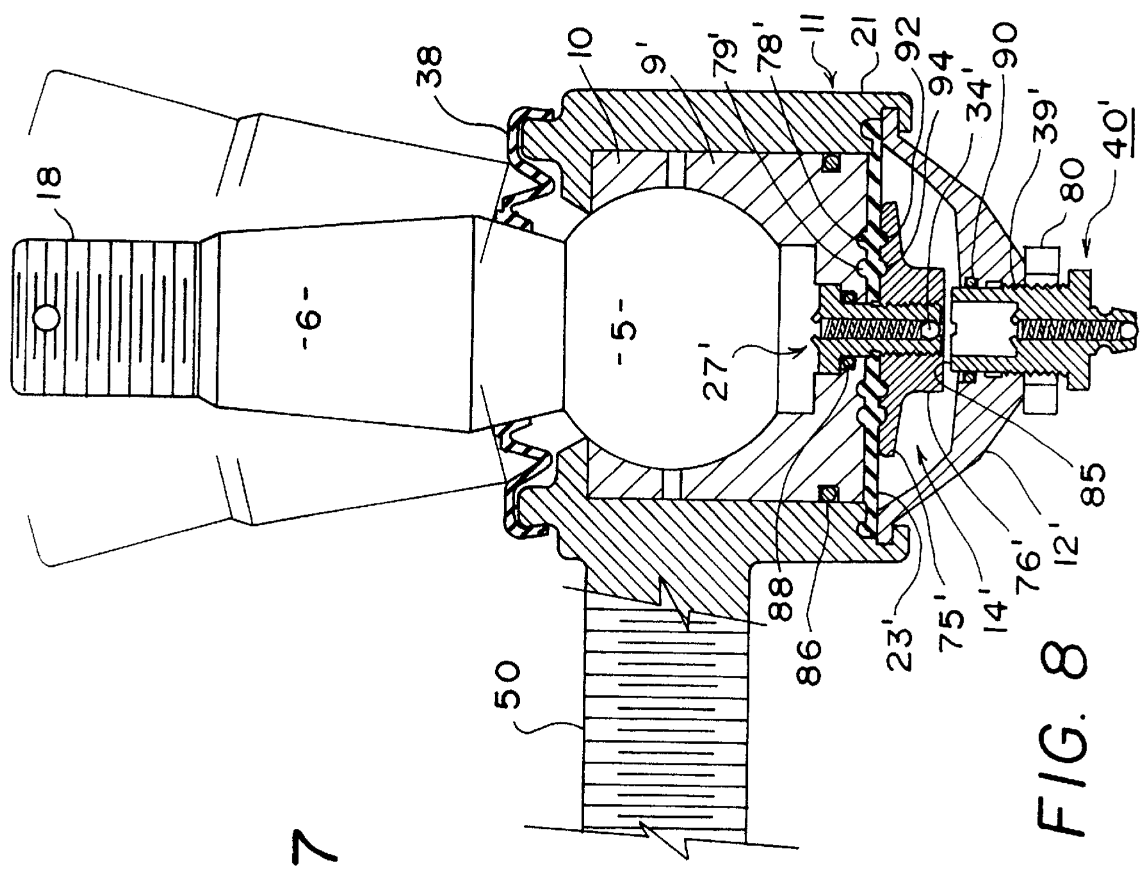
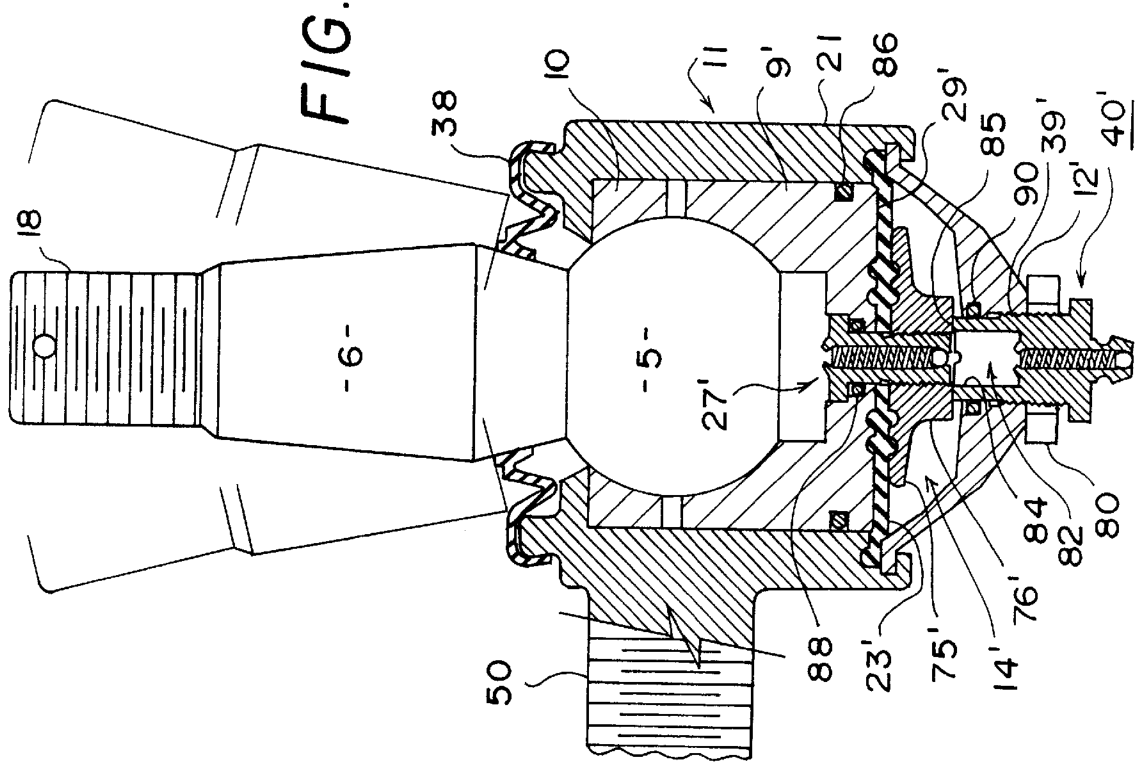

SEALED SELF-ADJUSTING BEARING ASSEMBLY

RELATED APPLICATIONS

This disclosure is an improvement over the self-adjusting bearing assembly described in prior application Ser. No. 08/175,713 which issued as U.S. Pat. No. 5,435,652, the entire contents of said patent being expressly incorporated herein by reference.

FIELD OF THE INVENTION

The invention relates to the field of ball joints, and in particular, to a self-adjusting ball joint providing a slack free bearing assembly.

BACKGROUND OF THE INVENTION

Ball joints usually are made up of a ball member and a bearing seat member. Such joints may also be referred to as universal joints since they allow movement around the joint in multiple directions, unlike joints which allow movement around an axis in only one plane, such as hinges.

The ball member of ball joints has a spherically-shaped bearing surface formed over at least a portion of its outer surface. The bearing surface may be formed over only a central portion of the ball member and one or more other portions may have non-spherical surfaces. One side of the ball member may be connected to a connector member, such as a connecting arm, rod, stub or other elongated means for attaching the ball member to a frame member, an arm member, or other support member. The connector member may include a threaded end which facilitates attaching the connector member to the support member.

The bearing seat member has a bearing surface on its inner surface which is shaped to complement the bearing surface on the ball member so that these bearing surfaces are in sliding engagement with each other. A portion of the bearing seat member, or a housing in which it is mounted, may be connected to a movable member, such as a tie rod moved by a steering mechanism.

The bearing seat member of a bearing assembly has a passage connecting the interior socket formed by its bearing surface with the outside of the member. When the ball member is engaged in the socket of the seat member, the connector member attached to the ball member extends through this passage and is connected to the support member of whatever apparatus the bearing assembly is being used with. The passage must be sufficiently wide to allow the ball member freedom of movement over the desired range, but not so large as to allow the ball member to fall out of the socket or to allow the seat member to travel over too great a range of movement.

Ball joints and bearing assemblies having a ball member are used in a variety of well known applications. For instance, trailer hitches for automobiles towing trailers usually include a ball member attached to an arm which is then fixed to the frame of the car, and a bearing seat member attached to a tongue extending from the trailer being towed. Ball joints are also an integral part of vehicle steering assemblies and suspension systems. For example, in steering systems, a ball joint in the form of a rod end bearing may be used to connect a tie rod to the arm of a steering knuckle. In vehicle suspension systems, ball joints may be used to connect an independent suspension between the vehicle and the wheel. Ball joints are also used in a variety of other applications.

While ball joints of the type described above are in use, the bearing surfaces on the ball member and the bearing seat member rub against each other. As the two bearing surfaces rub against each other, the bearing surfaces can be worn down through friction, causing the joint to become loose and members of the steering assembly to move from their intended positions. Slack therefore develops in the steering assembly and the steering control becomes sloppy.

As a result, the vehicle will more easily move away from the path the operator directs it on, the vehicle steering will become less precise and less predictable, and the vehicle therefore may become difficult to control. For example, 0.002 to 0.003 inch of slack in the ball joint of a vehicle steering assembly is sufficient to cause the vehicle to turn away from straight ahead. Obviously, a vehicle having a steering assembly in which such slack exists may be difficult to control, and may even be dangerous. The problems caused by a loose joint can be especially bad if the vehicle is a large vehicle, such as a truck.

Slack in other ball joints can cause similar problems. For instance, where a ball joint is incorporated into a trailer hitch, a slack joint can cause the trailer to sway from side to side behind the towing vehicle. Such a situation can be very dangerous both to the person trying to control the vehicle and other motorists on the road. Similarly, a slack joint in a vehicle suspension system can adversely effect the safety of the vehicle, as well as the quality of the ride and the comfort of the occupants.

As evident from the above discussion, slack in ball joints can have serious consequences to the apparatuses in which the ball joints are incorporated, and to the users thereof. Another problem with prior ball joints is that they may be excessively tight when initially installed in an effort to lengthen their usable life before excessive slack occurs. Tight ball joints are difficult to articulate because of high friction between the ball and seat members, which may interfere with proper functioning of the associated equipment. There is therefore a need for a slack free ball joint assembly with low friction between the ball and seat members throughout its useful life.

Several constructions of a slack free ball joint assembly are described in the inventor's prior U.S. Pat. No. 5,435,652 referred to above. However, these constructions have the disadvantage of allowing high pressure lubricant to leak around the movable bearing seat and ambient pressure lubricant to leak around the connector member. In addition, in some applications, higher lubricant pressures than desirable are needed to stabilize the movable bearing seat against movement in the direction of forces applied along the axis of the tie rod. High lubricant pressures are not desirable because they may make the ball joint excessively tight.

SUMMARY OF THE INVENTION

A principal object of the present invention is to overcome the foregoing problems of the prior art by providing a ball joint assembly which includes a mechanism for taking up slack in the ball joint as it develops, and which is never excessively tight because its structure inherently opposes forces applied along the tie rod axis. A further object is to provide such a ball joint mechanism which may be set and calibrated once, and then over time will remain true to those settings rather than becoming loose. Another object of the invention is to provide such a ball joint mechanism wherein the pressurized lubricant chamber is tightly sealed relative to the movable bearing seat.

The present invention thus provides an improved design for a ball joint bearing assembly. This ball joint assembly may serve as a self-adjusting tie rod end bearing between a tie rod and the arm of a steering knuckle. In this rod end bearing, the spherical head or ball member of the assembly is captured between at least two seat members each preferably made of a low friction plastic material and having inner surfaces configured complementarily to the ball member.

The two seat members are contained within a cylindrical cavity in a housing formed by an enlarged end portion of the tie rod. The axis of this cavity is transverse to the tie rod axis and extends generally in the direction of the connector member attached to a side portion of the ball member. The connector member extends away from an opening at one end of the cavity and an opening at the opposite end of the cavity is closed by a cap which cooperates with a movable one of the seat members to form a pressure chamber on the side thereof opposite to the ball member. This closure cap also holds the ball member and both seat members in the tie rod end cavity.

An internal passageway formed through the movable seat member connects the pressure chamber with the interface between the ball member of the rod end bearing and the seat members. An internal grease fitting is secured in the passageway and has a spring loaded check valve which prevents unrestricted flow of the grease out of the pressure chamber so that grease in the chamber may be pressurized. The ball member is held between the movable seat member and a fixed seat member, and the movable seat member is movable in response to chamber pressure to maintain a slack preventing force on these components.

An external passageway through the closure cap connects the pressure chamber with the outside environment. An external grease fitting is secured within this passageway and contains a spring loaded check valve for admitting grease to pressurize the chamber. A sealing diaphram between the pressure chamber and the movable seat member is held in place by the closure cap and prevents grease in the pressure chamber from flowing around the edges of the movable seat member.

The ball member may have an outer bearing surface formed over only a portion of its outer surface, and the seat members may have inner bearing surfaces of corresponding shape and size to ensure that the ball member rides on an opposing bearing surface at all times. This in turn ensures a wide range of movement for such components as may be attached to the seat member housing. Additionally, precisely machined bearing surfaces do not have to be formed over as large a surface area of the ball and seat members, and the weight of the bearing assembly may be reduced.

In operation, the pressure chamber is filled with a sufficient amount of grease or other lubricant fluid to create a substantial pressure against the movable seat member, thereby forcing it against the ball member of the rod end bearing. Only a relatively low pressure is required because this pressure urges the movable seat member in a direction perpendicular to the direction of the steering forces that are supplied along the axis of the elongated tie rod component. This pressure not only holds the ball member in place against the fixed seat member, but also takes up any slack as the ball and seat members wear against each other.

Thus, the pressure of grease within the pressure chamber will eliminate any slack that might otherwise develop between the steering knuckle and the tie rod, while causing only a low level of friction between the ball and seat members. The low level of friction allows easy articulated movement between the tie rod and steering knuckle. The design of the check valve in the internal grease fitting is such that a relatively low chamber pressure will exceed the spring force of this valve, causing grease to be released into the interface between the seat members and the ball member of the rod end bearing.

In another embodiment of the invention, the external grease fitting is provided with a screw mechanism by which an initial level of force may be applied to the movable seat member independently of any pressure within the pressure chamber. This mechanism constitutes an"adjusting screw" for mechanically setting a level of friction between the ball and seat members as the starting level when the ball joint is first installed for use. One advantage of the adjusting screw is that the proper low level of friction may be set initially without having to rely on the machining of close tolerances between the ball and seat members. In other words, preloading with the adjusting screw allows a wider range of component tolerances such that the cost of manufacturing the ball and seat members may be substantially reduced, thereby making the entire ball joint more economical.

Another feature of the adjusting screw is that it may be used either in place of or as a supplement to the adjusting force provided by fluid pressure in a pressure chamber. Thus, the adjusting screw provides a means for manually biasing the movable seat member against the ball member as an alternative to using fluid pressure in a pressure chamber. For example, fluid pressure in the pressure chamber disclosed could be lost due to a stuck condition of the internal grease fitting. In this regard, the pressure chamber may be considered as an automatic means of adjusting the movable seat member, whereas the adjusting screw may be considered as a manual means of adjusting the moveable seat member.

In either case, whether provided automatically or manually, the pressure applied to adjust the level of force pressing the movable seat member against the ball member is selected to provide just enough force to keep the ball joint slack free. This level of force will provide sufficiently low friction between the ball and seat members that the ball joint will allow relatively free and easy articulated movement between two equipment components connected by the ball joint. These slack free and low friction characteristics are maintainable throughout the life of the ball joint, whether using the automatic adjusting means, the manual adjusting means, or both of these means.

BRIEF DESCRIPTION OF THE DRAWINGS

The invention may be further understood from the following detailed description thereof taken in conjunction with the accompanying drawings, in which:

FIG. 7 is an elevational side view in partial cross-section of a self-adjusting bearing assembly according to another embodiment of the present invention; and FIG. 8 is an elevational side view in partial cross-section showing the self-adjusting bearing assembly of FIG. 7 wherein the movable seat member has moved inward toward the ball member.

DETAILED DESCRIPTION OF THE PREFERRED EMBODIMENTS

Figures 1, 3, 4, 5:
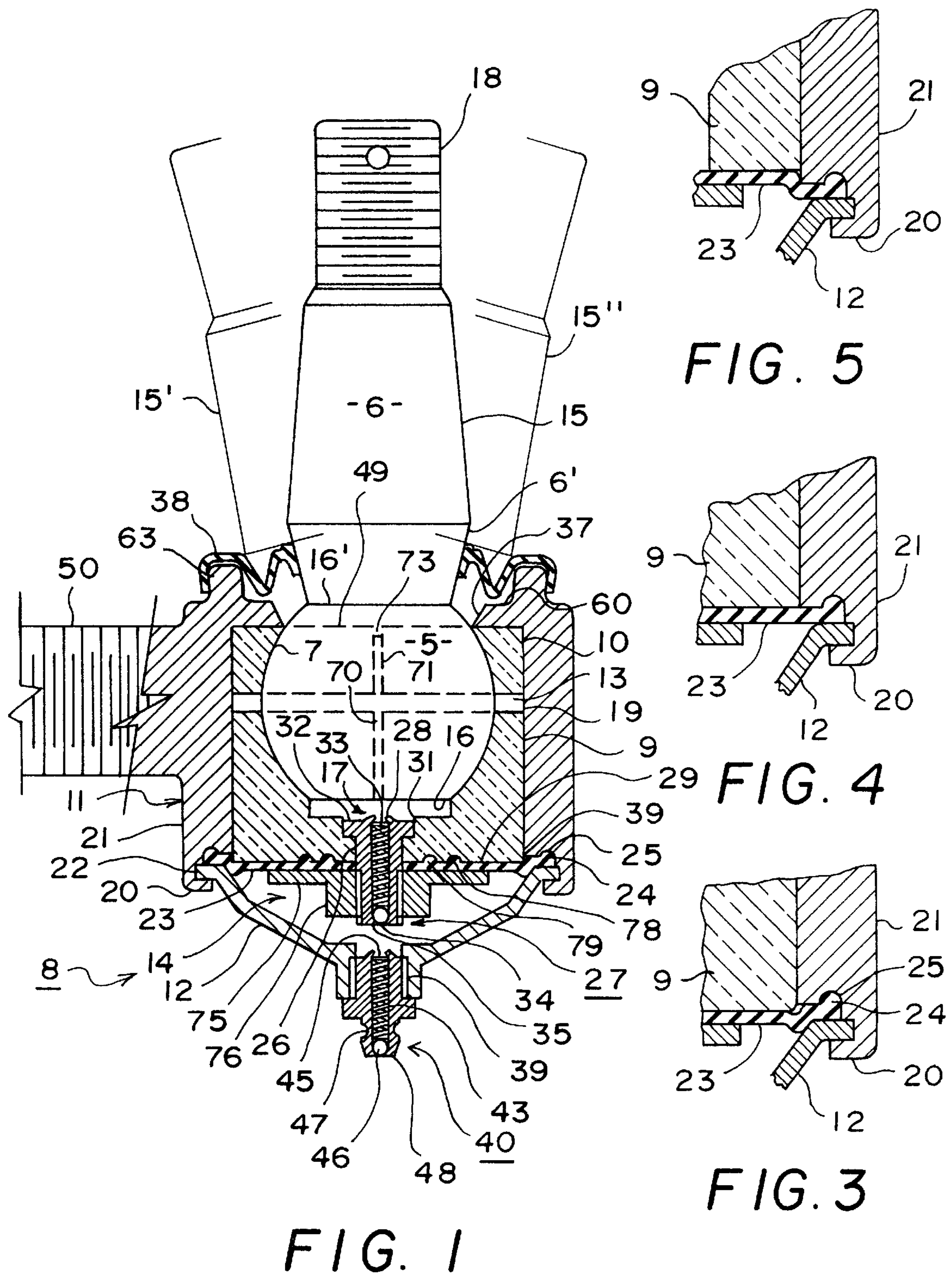
FIG. 1 is an elevational side view in partial cross section of a self-adjusting bearing assembly according to one embodiment of the present invention.
FIG. 3 is a fragmentary sectional view showing structural details of the FIG. 1 embodiment when the movable seat member is in an initial position.
FIG. 4 is a fragmentary sectional view showing structural details of the FIG. 1 embodiment when the movable seat member is in an intermediate position.
FIG. 5 is a fragmentary sectional view showing structural details of FIG. 1 embodiment when the movable seat member is in a terminal position.
Figure 2:
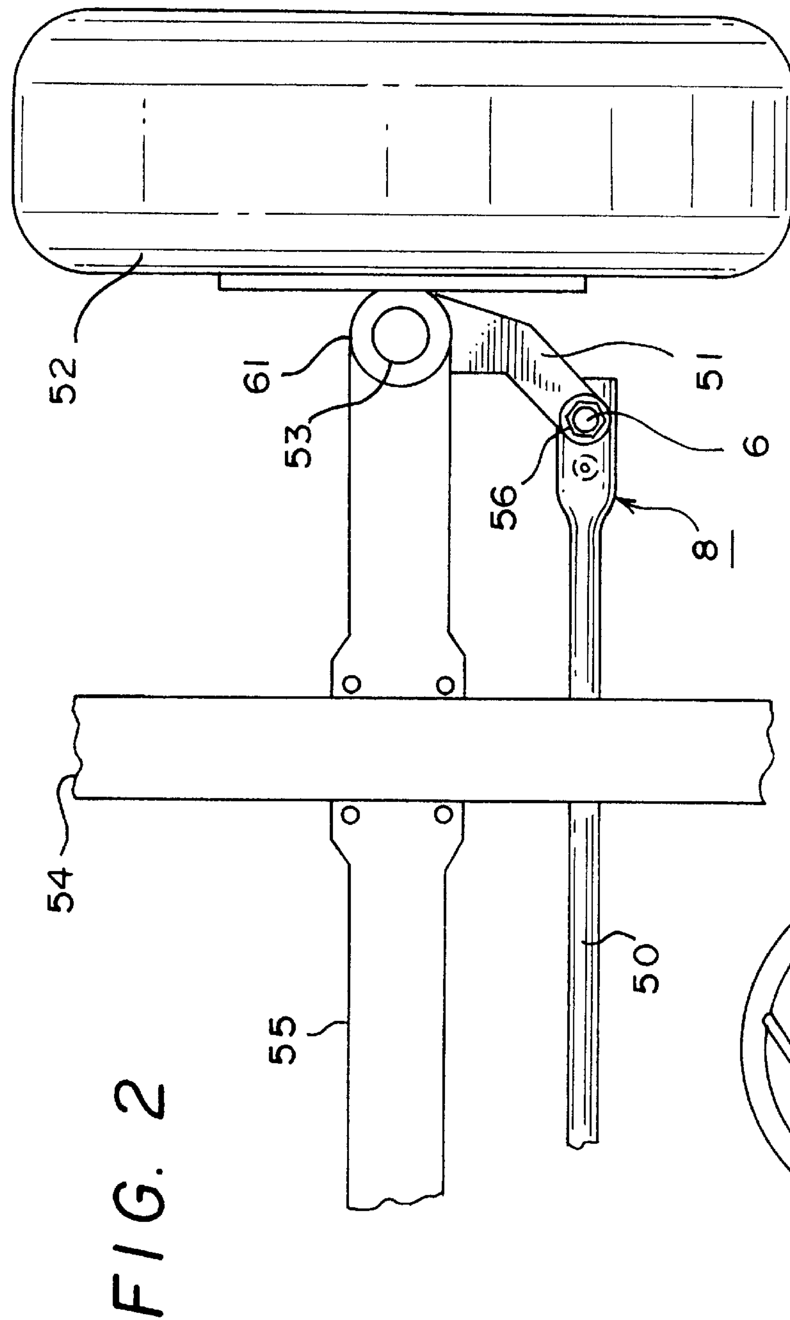
FIGS. 2 is an overhead view of the embodiment shown in FIG. 1 incorporated into a vehicle steering assembly.

FIG. 1 shows a preferred embodiment of a self-adjusting rod end bearing assembly 8 according to the present invention. This embodiment may be incorporated into a vehicle steering assembly as shown in FIG. 2, and is only one example of a self-adjusting bearing assembly which may be made in accordance with the teachings of the present invention. The embodiments may vary, depending upon the application. Thus, variations of the bearing assembly and of its ball joint may be incorporated into a variety of devices. Furthermore, each of the components of the bearing assembly may be made up of one or more elements, and the invention may also include various other components.

The self-adjusting rod end bearing assembly 8, according to the embodiment shown in FIG. 1, includes a bearing housing 11, and an end closure cap 12 forming a pressure chamber 14. The rod end bearing assembly also comprises a ball member 5 and a connector member or pin 6. The ball member 5 includes a spherically-shaped bearing surface 7. The bearing surface 7 may cover the entire ball member 5 with the exception of the connector member 6. Alternatively, the bearing surface 7 may be formed on only a mid-section of the ball member as in the embodiment shown in FIG. 1.

The bearing surface 7 may also have a non-spherical shape. For example, the ball member may be replaced by a head member having an elliptical cross-section. Either the major axis or the minor axis of the elliptical cross-section may be positioned parallel to the longitudinal axis of the connector member to allow the head member to rotate about the parallel axis. However, the head member would resist movement about other axes.

In the embodiment shown in FIG. 1, two portions of the ball member do not have a bearing surface formed on them. One of these has a substantially flat end surface 16 indented from where the surface of a complete sphere conforming to the bearing surface 7 would otherwise be located. End surface 16 cooperates with a pair of bearing seat members 9 and 10 to form an ambient pressure lubricant chamber 17. The other portion of the ball member not having a bearing surface is the proximal portion 16' connected to the connector member 6.

The connector member 6 of the rod end bearing assembly 8 is a generally elongated member or pin extending outward from the ball member 5. In the embodiment shown in FIG. 1, the length of the connector member 6 is about one to two times the diameter of the ball member. However, the connector member is not limited to that length and therefore it may be longer or shorter, depending upon the application. The connector member may also have other shapes.

The connector member 6 preferably includes connection means. The connection means on the connector member 6 is a tapered portion 15 and a threaded portion 18 formed on its distal end as shown in FIG. 1. The connection means is used to connect the rod end bearing to a lever arm or other articulated member of the apparatus on which the bearing assembly is being used. The lever arm contains a tapered aperture for receiving the tapered connector portion 15 and these two tapered elements are firmly jammed together by tightening a nut onto the threaded portion 18. Other types of connection means may be used to attach the rod end bearing to the articulated member of an apparatus.

The ball member and connector member may be formed from the same piece of metal or may be formed separately and then joined together. The ball member and the connector member may be cast separately in different molds and then joined together by welding or the like, or they may be cast as one piece. Alternatively, the ball and the connector may be forged separately or together. Other materials, such as plastic, and other techniques may also be used to form the ball member and the connector member.

The self-adjusting bearing assembly also comprises the bearing seat means provided by the at least two bearing seat members 9 and 10. Each bearing seat member may be made up of one or more pieces. In the embodiment shown in FIG. 1, the bearing seat means includes the two bearing seat members 9 and 10. Each of these bearing seat members is made up of one piece. The bearing seat members preferably are made of low friction plastic, but may be made of metal or any other suitable bearing material.

The bearing seat members 9 and 10 are housed within a cylindrical chamber 19 of housing means 11. Preferably, the entire outer perimeter of at least some portion of each bearing seat member directly contacts the interior surface of cylindrical wall defining chamber 19. At least one bearing seat member must be movable. The other bearing seat member may be fixed or movable. In the embodiment shown in FIG. 1, bearing seat member 9 is movable and bearing seat member 10 is fixed.

The bearing seat members 9 and 10 have bearing surfaces formed on the surface of each which faces the ball member 5 and engages its bearing surface 7. The seat member bearing surfaces preferably are complementarily shaped to the bearing surface of the ball member. Therefore, as with the bearing surface on the ball member, the bearing surface on each seat member preferably is spherically-shaped.

The bearing seat members preferably extend around a majority of the surface of the ball member. However, the bearing seat member 10 stops short of the area of the ball attached to the connector member. The bearing seat member 9 has a counterbore forming a gap or chamber 17 adjacent to the flat area 16 of the ball member on its side opposite the connector member 6. At least a portion of the bearing surface of each bearing seat member contacts and rides on the bearing surface 7 of the ball member at all times. However, these contacting surfaces may be separated from each other by a thin layer of a lubricating substance.

A compression slot 13 exists between the inner opposing surfaces of the two bearing seat members 9 and 10 when the bearing assembly is assembled. The compression slot 13 allows the movable bearing seat 9 to adjust its position relative to the fixed bearing seat 10 and the ball member 5 in response to pressure in the pressure chamber 14 as the bearing surfaces wear. The initial width of compression slot 13 defines the maximum amount of axial movement of seat 9 relative to seat 10 as the bearing surfaces wear. Although not shown here, the seats 9 and 10 may optionally include abutting guide surfaces as described in U.S. Pat. No. 5,435,652 to help maintain the bearing seat members in proper alignment when seat member 9 moves as the bearing surfaces wear.

The housing means 11 in the embodiment shown in FIG. 1 is a single, elongated, hollow cylindrical body which is open at both ends and is formed at each end of a tie rod 50.

Although only the right end is shown in FIG. 3, the bearing assembly of the invention is also used at the left end (not shown) of tie rod 50, this left end bearing assembly being a mirror image of that shown in FIG. 1. The housing means 11, the closure cap 12, the seat members 9 and 10 and the chambers 14 and 19 may have other cross-sectional shapes, as long as the space within the housing means and closure cap can accommodate the seat members, the ball member, and the pressure chamber. Also, the housing means 11 may comprise a plurality of housing members joined together to form a single housing structure.

The housing 11 has a first opening 37 formed through an end wall 60, and through which the connector member 6 extends. Preferably, the width of opening 37 is at least as large as the opening 49 in the outer face of the bearing seat member 10. The openings 37 and 49 may be circular, square or any other suitable shape. The opening 37 in housing wall 60 preferably has an outwardly beveled surface facing the connector member 6. The beveled surface, as shown in the embodiment of FIG. 1, is preferably angled away from the connector member so that the opening 37 becomes wider as the distance away from the ball member increases. The beveled surface allows the connector member to pivot through an arc around the center of ball 5 by providing space for the connector member to move laterally as illustrated by fragmented lines 15' and 15". The beveled surface may also act as a stop surface to limit the arc through which connector member 6 may pivot relative to housing means 11.

Preferably, the area between the side of the opening 37 and the connector member 6 is sealed by a boot seal 38. The boot seal 38 preferably is made of an elastomeric material which will flex as the connector member 6 pivots to follow corresponding rotation of ball member 5 within chamber 19. The boot seal contacts or is attached to a ridge 63 of the housing means 11 and to a beveled side surface 6' of the connector member 6. The boot seal 38 helps to contain any lubricant which seeps out from between the ball member 5 and the opening 49 of bearing seat member 10, and also to prevent dirt and other debris from entering the bearing assembly.

The pressure chamber 14 is provided on housing means 11 by the closure cap 12, which is secured to a corresponding end portion of a cylindrical housing sidewall 21 by a crimped sidewall projection 20 of housing 11. Clamped between the rim 22 of cap 12 and the sidewall end is a diaphram 23 made of a resilient material, such as synthetic rubber. Diaphram 23 completely covers a second opening 39 in housing 11 at its end opposite to end wall 60. Diaphram 23 includes an inwardly projecting rib 24 around its outer periphery and this rib is tightly clamped by the cap rim 22 in sealing engagement within a correspondingly shaped groove 25 in the sidewall end to form a tight fluid seal. The cap 12 thus provides a second chamber contiguous to, but of different shape and of smaller size than, the cylindrical chamber 19, which is here designated as the first chamber. Although the diaphram and its rib are preferably circular, they may have other shapes, such as square or rectangular.

An elevated pressure is created within pressure chamber 14 by introducing a fluid substance, such as grease, into the pressure chamber through an external valve fitting 40 in a passage 39 through cap 12, as described in more detail below. The size and shape of cap 12 determines the size of the pressure chamber 14, which consequently determines the amount of fluid required to be introduced into the pressure chamber to create the desired pressure.

The movable bearing seat member 9 substantially abuts the closure cap 12 initially, i.e., before substantial wear has occurred as shown in FIG. 3. The elevated pressure created within the pressure chamber 14 by the pressurized fluid presses the diaphram 23 against the outer "pressure" surface 29 of the movable seat member 9, and thereby forces the movable seat member 9 toward the ball member 5. FIGS. 3, 4 and 5 illustrate the movement of seat member 9 and diaphram 23 as the seat members become worn by their engagement with the ball member.

To facilitate lubrication of the interface between the bearing surfaces on the ball member and the bearing seat members, the bearing seat members 9 and 10 may include lubrication access grooves 70 and 71, respectively. Each lubrication access groove, if included on the bearing seat members, is a narrow, shallow indentation which may extend radially and axially along the bearing surface of each seat member as shown in FIG. 1. The access grooves on opposing seat members 9 and 10, together with slot 13, form a substantially continuous passageway at least partially around the ball member.

Figure 6:
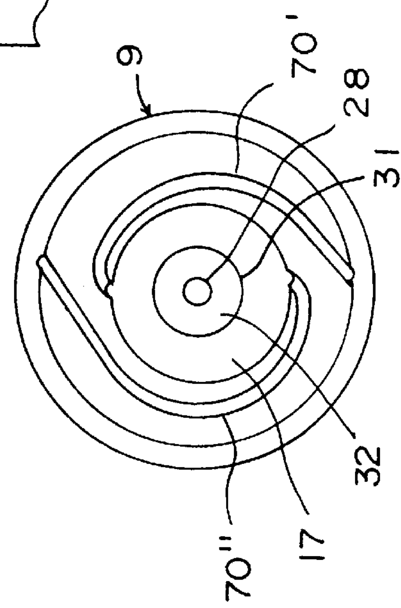
FIG. 6 is an end view of the inner face of a movable seat member which has been modified to include a spiral lubricant channel.

The peripheral extent of the continuous passageway is defined by a first end wall 73 on the seat member 10, and by a second end wall (not shown) on the seat member 10 at the opposite end of the passageway, which mirrors the grooves 70, 71. The groove end walls minimize the amount of lubricant that may leak out from the access grooves 70 and 71 into the free space around the connector member 6. Instead of extending axially as in FIG. 1, the lubricant grooves may extend transversely at an acute angle to form a spiral as illustrated by grooves 70' and 70" in FIG. 6.

The grooves 70, 71 and the ball/seat interface are supplied with the lubricating fluid substance (lubricant) via an outlet passage 26 formed in the movable bearing seat member 9. Passage 26 connects lubricant chamber 17 between the ball member 5 and the bearing seat member 9 with the pressure chamber 14, in which a supply of lubricant is kept under pressure by external valve fitting 40. Passage 26 contains an internal valve fitting 27, which contains a spring loaded valve for releasing lubricant to chamber 17 as described below.

In the embodiment shown in FIG. 1, bearing seat member 10 is fixed within housing means 11 and bearing seat member 9 is movable upward in response to lubricant pressure in the pressure chamber 14. The movable bearing seat member is adjacent to the pressure chamber 14, and is the lower bearing seat member 9 in the embodiment shown in FIG. 1. The diaphram 23 is firmly secured to the outer end of seat member 9 by a plate 75 having a boss 76 which is threaded to the body of valve fitting 27. The diaphram is preferable anchored against lateral movement by a pair of circular concentric ribs 78, 79 which fit within correspondingly shaped concentric grooves in the outer face of seat member 9. The diaphram also may be attached to the outer seat face by an adhesive.

The outer periphery of diaphram 23 sealingly engages the end surface of the housing wall 21 which defines the cylindrical chamber 19 in housing means 11. The diaphram 23 thus prevents pressurized lubricant contained in pressure chamber 14 from leaking around the exterior of bearing seat members 9 and 10 and into the opening 37 adjacent to connector member 6. This insures that the pressure on the lubricant in pressure chamber 14 is positively maintained. Although in the embodiment shown in FIG. 1, only the bearing seat member 9 is movable and has a sealing diaphram, each bearing seat member may be movable by a corresponding pressure chamber and may have a corresponding sealing diaphram.

The movable bearing seat member 9 also includes a second counterbore 31 at the inner end of the outlet passage 26 for receiving a flange 32 at the inner end of the internal check valve fitting 27. A central passage 28 of the fitting 27 provides fluid communication between the pressure chamber 14 and the surface of the ball member for the purpose of introducing some of the lubricant contained in the pressure chamber into the interface between the ball member 5 and the bearing seat members 9 and 10.

Internal fitting 27 and its passage 28 provide means for relieving excess pressure within pressure chamber 14, while simultaneously introducing the lubricating substance around the ball member 5, as described in more detail below. The internal fitting 27 may include connecting means other than the threaded connection between it and plate 75 for retaining the internal fitting in the passage 26. For example, the internal fitting may be swaged to the boss 76, or held in the aperture of the boss by frictional engagement or welding.

The internal fitting 27 includes upset portions which may be formed by swaging and provide inwardly projecting inner and outer lips at the respective ends of central passage 28 so that a spring 33 and a ball valve 34 are held in place within the central passage. After the spring and ball valve are inserted in passage 28, the inner end of the spring 33 is retained by the corresponding inner lip. At the other end of the passage, the spring applies pressure to the ball valve 34, forcing the ball valve 34 to close a smaller inlet passage 35 defined by the outer lip which serves as a seat for the ball valve.

Fitting 27 serves as a check valve because flow from passage 28 into chamber 14 is prevented when ball valve 34 is held in its seated position by spring 33. Lubricating fluid will only flow through the internal fitting if the pressure within pressure chamber 14 is sufficiently great to overcome the spring force of the spring 33 in the internal fitting 27. The pressure required to open ball valve 34 may be changed by changing the spring within the internal fitting.

Preferably, the fluid introduced into the pressure chamber 14 is a viscous liquid. More preferably, the fluid is a lubricating liquid, such as grease. By using grease as the pressure generating fluid, this fluid serves a second purpose, namely, the grease lubricates the respective bearing surfaces by passing through the internal fitting 27, the chamber 17 and the grooves 70 and 71, and into the interfacial area between the ball member 5 and the bearing seat members 9 and 10.

The grease is introduced into pressure chamber 14 through the external passage 39 containing the external fitting 40. The external passage 39 is formed in the wall of closure cap 12 and the external fitting 40 is preferably threaded therein. The external passage 39 and external fitting 40 preferably are similar to the internal passage 26 and the internal fitting 27 in the movable bearing seat 9.

The external fitting 40 has an internal passage 43 formed through its entire length. The passage 43 preferably includes a central portion of sufficient diameter to contain a spring 45 and a ball valve 46. Smaller diameter upset portions are formed, such as by swaging, at each end of the passage 43 to retain spring 45 and ball valve 46 therein. The ball 46 is forced outward against a valve seat formed by an outer lip 48 on the outer end of fitting 40 by the spring 45, and also by the pressurized fluid within the pressure chamber 14. Thus, the external fitting 40 is a one-way check valve which allows lubricant to be introduced into the pressure chamber but prevents the lubricant from leaving the chamber. Internal fitting 27 therefore provides the only outlet for grease in pressure chamber 14.

The external fitting 40 may also be secured in the external passage 39 by suitable means other than the threaded connection shown in FIG. 1, such as by welding, swaging or the like. The portion of external fitting 40 which extends away from the surface of cap 12 may include means, such as annular groove 47, for attaching a source of the lubricant to be used in the pressure chamber 14, such as a grease gun (not shown). The attachment means is used to facilitate the introduction of lubricant under pressure into the pressure chamber.

Fluid is introduced into the pressure chamber 14 until the pressure is sufficient to hold the bearing seat members 9 and 10 securely against the ball 5 while all steering forces necessary for precisely steering vehicle wheel 52 are being transmitted between tie rod 50 and steering knuckle 61. When the fluid pressure exceeds the force of spring 33 on ball 34 in the internal fitting 27, the fluid will be forced around ball 34, through fitting passage 28, chamber 17 and access grooves 70 and 71, and into the interface between the ball member and the bearing seat members. The pressurized fluid is prevented from flowing between the bearing seat member 9 and the housing wall 21 by the sealing diaphram 23. This sealing member positively prevents the fluid from traveling around bearing seat member 9 as this seat member moves due to wear on the bearing surfaces.

The embodiment of the bearing assembly shown in FIG. 1 is assembled by first inserting the fixed bearing seat member 10 into the housing chamber 19 until it abuts the end wall 60 of this cavity. Next, the ball member 5 is inserted through the opening 39 while passing the connector pin 6 through the opening 49 in seat member 10 and the opening 37 in the end wall 60 of the housing means 11. Then, the movable bearing seat member 9, with the fitting 27 inserted therein, is positioned into the housing chamber 19 until it firmly abuts the ball member 5. Subsequently, the hole in the center of diaphram 23 is passed over the outwardly projecting threaded end of fitting 27, and the boss 76 of plate 75 is threaded and tightened down onto this threaded end to secure diaphram 23 against the outer face of seat member 9. This also firmly seats flange 32 in counterbore 31.

Alternatively, diaphram 23 and fitting 27 may be secured (locked) in position by plate 75 before the movable bearing seat 9 is inserted into housing chamber 19. Thereafter, cap 12 is placed over diaphram 23 and fitting 27 and is clamped in position by swaging or otherwise deforming the end of sidewall 11 to form the crimped sidewall projection or ridge 20. Although ridge 20 is preferably crimped around its entire periphery, it may instead be crimped only at regularly spaced segments.

Fixing the closure cap 12 to the abutting end of housing sidewall 21 locks the bearing seat members 9 and 10 and the ball 5 of the rod end bearing 8 securely within the housing means 11. The boot sealing member 38 may then be placed about the connector member 6 and secured to the circular ridge 63 adjacent to the end wall 60 of the housing means 11. Thereafter, the pin 6 is fastened to the steering knuckle 61 by tightening the nut 56 on the pin threads 18. Pressure chamber 14 is then pressurized with lubricant to a sufficiently high pressure so that the pressure applied to the ball member 5 by the two bearing seat members 9 and 10 is sufficient to prevent any significant slack between the ball member and the bearing seat members, but not so great that the ball member will not move freely with a lubricant between the bearing surfaces.

Grease is introduced into the pressure chamber 14 through external fitting 40 until the pressure is sufficient to open the check valve in fitting 27. Grease then flows through passage 28 and grooves 70 and 71, and spreads out over the bearing surface 7 of the ball 5 and the corresponding bearing surfaces of bearing seat members 9 and 10. As these bearing surfaces wear, movable seat member 9 moves toward chamber end wall 60 to maintain the slack free engagement between the bearing surfaces of the seat members and the opposing bearing surface of ball 5. This is illustrated by the progressive movement of seat member 9 and diaphram 23 shown in FIGS. 3–5.

FIG. 2 shows the bearing assembly of the present invention being used in the steering assembly of a land vehicle, such as a truck or automobile. The self-adjusting rod end bearing 8 connects the tie rod 50 of the steering system to the arm 51 of the steering knuckle 61. Other components of the steering and suspension system shown in FIG. 2 include the vehicle wheel 52, a king pin 53, leaf springs 54, and axle 55. The connector pin 6 of the rod end bearing assembly 8 is secured to the arm 51 by the nut 56, which pulls the tapered surface 15 of the pin into tight engagement with a corresponding tapered surface (not shown) of an aperture through the end portion of arm 51.

Another embodiment of the invention is shown in FIGS. 7 and 8 wherein the fixed external fitting 40 of FIG. 1 has been replaced with an adjustable external screw fitting 40'. The adjustable screw fitting 40' is threaded within an opening 39' through end cap 12', and the treads on the fitting 40' are arranged relative to the threads in the opening 39' such that the fitting is axially adjustable for inward and outward movement relative to the boss 76' on the plate 75'. After adjustment, the axial position of the fitting 40' is preferably locked in place by a locking nut 80. The fitting 40' includes an internal chamber 82 defined by a surrounding wall 84 such that the inner end 85 of the fitting 40' will not interfere with operation and/or axial adjustment of the internal valve fitting 27' when the inner end 85 butts against the boss 76' as shown in FIG. 7. The remaining features of the internal valve fitting 27' and the external valve fitting 40' are essentially the same as those of the internal valve fitting 27 and the external valve fitting 40 of FIG. 1.

The introduction of a fluid pressure into the pressure chamber 14' of the FIG. 7 embodiment causes the same slack removal pressure on the movable seat member 9' as does the introduction of a pressurized fluid into the pressure chamber 14 of the FIG. 1 embodiment already described. However, in the FIG. 7 embodiment, the valve fitting 40' constitutes an adjustable screw means for preloading the movable seat member 9' with a slack removal force independent of the fluid pressure in the pressure chamber 14'.

Although this preloading force may be less than, equal to, or greater than the slack removal force provided by fluid pressure in chamber 14', it is preferable that the preloading force provided by the adjustable screw means be approximately equal to the slack removal force provided by fluid pressure. If these relative forces are substantially equal, the slack removal force will remain substantially constant as the boss 76' moves away from the outer end 85 of the screw means due to wear of the bearing seat members as illustrated in FIG. 8.

The slack removal forces provided by both the screw means and the fluid pressure means are preferably of a sufficiently low order of magnitude that the engagement between the seat and ball members is never excessively tight, thereby providing both a low friction and a slack free ball joint. One way in which to establish this desired level of preloading with the screw means is to firmly tighten the inner end 85 of the fitting 40' against the boss 76', and then to back off the fitting 40' by a slight amount, such as a quarter or a half turn, before tightening the lock nut 80 to lock the fitting 40' in the resulting low friction position. The ease of articulated movement between components connected by the ball joint may then be determined and chamber 14' pressurized to a pressure providing substantially the same ease of articulated movement.

Use of the adjustable screw fitting 40' provides several important advantages. These include allowing a wider range of tolerances in the fit between the bearing surfaces of the seat members and the bearing surface of the ball member. The use of screw fitting 40' also permits applying a slack free force on moveable seat member 9' in case a loss of pressure occurs in the chamber 14', such as might be caused by a malfunction of the ball valve 34'. For example, if ball valve 34' becomes stuck in an open position such that the fluid pressure in chamber 14' is lost, locking nut 80 may be loosened and fitting 40' screwed in manually further than shown in FIG. 8, until its inner end 85 again butts against boss 76' and mechanically applies a slack removal force to moveable seat member 9'. Such manual adjustments may be repeated periodically as the ball and seat members wear so that an appropriate level of slack removal force is maintained throughout the life of the unit even in the absence of pressure within chamber 14'.

It is therefore an important feature of the embodiments of both FIGS. 1 and 7 that the level of slack removal force applied to the movable seat member may be just enough to keep the ball joint slack free, while at the same time providing a low friction joint that permits easy articulated movement of the equipment components connected by the ball joint. These same low friction and slack free characteristics are maintainable throughout the life of the joint, either by using pressurized fluid in the corresponding pressure chamber, or by manual adjustment of the adjustable screw fitting of the embodiment of FIG. 7.

There are several additional features of the invention shown in FIGS. 7 and 8 that are not shown in FIG. 1, although they may be used with the FIG. 1 embodiment. These include the O-ring seal 86 between the housing wall 21 and the seat member 9', the O-ring seal 88 between the internal valve fitting 27' and the seat member 9', and the O-ring seal 90 between the fitting 40' and the end cap 12'. In addition, a pair of circular concentric ribs 92 and 94 are provided on the diaphram 23', and these ribs fit within correspondingly shaped concentric grooves in the inner face of plate 75' to anchor the diaphram against lateral movement relative to the plate 75'. Similar to the diaphram 23 of FIG. 1, a pair of circular concentric ribs 78' and 79' are provided to anchor the diaphram against lateral movement relative to the outer pressure surface 29' of the movable seat member 9'.

The specific constructions shown and described for the external and internal fittings in the embodiments disclosed are for the use of a liquid as the fluid for pressurizing pressure chambers 14 and 14'. However, with appropriate modifications easily recognized by those skilled in the art, the internal and external fittings may be adapted for the use of a gas as the pressurizing fluid in pressure chambers 14 and 14'. In this alternative embodiment, a separate fitting may be provided to introduce a lubricating fluid into the gap 13 between the bearing seats as shown and described in U.S. Pat. No. 5,435,652.

The self-adjusting bearing assembly of the present invention may be used anywhere that known non-self-adjusting bearing assemblies are currently being used. Thus, self-adjusting bearings may be used in a number of other applications, such as the interconnected and articulated arm segments used in robotic assemblies of the types now widely employed in manufacturing assembly lines. In this application, a self-adjusting bearing assembly may be placed at each end of each segment of the robot's articulated arm(s).

The self-adjusting bearing assembly also may be used as a trailer hitch. In this application, the ball 5 and connector pin 6 of rod end bearing assembly 8 would be attached to the rear of the vehicle frame, as is normally the case with trailer hitches. The bearing seat portion of the assembly within its housing means 11 would be at the distal end portion of a tongue extending from the trailer.

In use, as a bearing assembly wears, the friction between the ball member and the bearing seat members will wear away some of the material at the bearing surfaces of these members, preferably on the seat members. As the bearing surfaces wear, the pivotal joint provided by conventional bearing assemblies can become sloppy because space or gaps develop between opposing bearing surfaces. However, with the present invention, such space or gaps cannot develop between the bearing surface of the ball member and bearing surfaces of the bearing seat members because, as the bearing surfaces wear, the pressure of lubricant in the pressure chamber 14 or 14', or the manually adjusted screw fitting 40', will continuously force the movable bearing seat 9 or 9' against the ball member 5 and the ball member 5 against the stationary bearing seat 10.

The bearing assembly of the present invention will need to be replaced much less frequently than conventional bearing assemblies because substantially greater amounts of wear can occur in the former relative to the latter without resulting in a slack connection. Thus, with a bearing assembly incorporating the present invention, replacement of worn bearing parts can be delayed for a much longer period of time. The only maintenance which will routinely be required on the present invention is the addition of lubricant to maintain adequate pressure in the pressure chamber. The bearing components will only need to be replaced if they become severely worn, and it is believed that this may not occur during the useful life of many vehicles. However, if needed, replacement is easily accomplished by reversing the assembly procedure described above, followed by reassembly with new parts.

What is claimed is:

1. A self-adjusting bearing assembly, comprising:

bearing means comprising a ball member and a connector member, said ball member having an outer bearing surface extending about at least a central portion of the ball member;

housing means defining a bearing chamber having an open end;

bearing seat means comprising at least two opposing bearing seat members arranged in said bearing chamber to define therebetween a space for receiving said ball member, each of said bearing seat members having an inner bearing surface conforming substantially to the shape of the outer bearing surface of said ball member and arranged to engage the outer bearing surface of said ball member while allowing said ball member to rotate, at least one of said bearing seat members being movable in said bearing seat chamber, and said connector member extending through a passage formed at least in part by said housing means; and adjusting means for urging said movable bearing seat member toward said ball member such that the inner bearing surfaces of said seat members engage the outer bearing surface of said ball member, said adjusting means comprising a resilient diaphram arranged to cover and seal the open end of said bearing chamber, a pressure chamber in fluid communication with a first surface of said diaphram, and means for pressurizing said pressure chamber with a fluid, a second surface of said diaphram opposite to said first surface being arranged to apply pressure to a pressure surface of said movable bearing seat member in response to said chamber pressure, said pressure surface being on a side of said movable bearing seat member opposite from said ball member, and said movable bearing seat member being arranged to be forced against said ball member by said diaphram when said pressure chamber is pressurized by said fluid.

2. A self-adjusting bearing assembly according to claim 1, wherein said housing means comprises a housing member forming said bearing chamber, and wherein said pressure chamber is provided by cap means arranged on said housing member to close said bearing chamber.

3. A self-adjusting bearing assembly according to claim 2, wherein a peripheral portion of said closure cap is secured to an end portion of said housing member, and wherein a rib extending around a peripheral portion of said diaphram is held in sealing engagement with a groove in said housing end portion by said closure cap peripheral portion.

4. A self-adjusting bearing assembly according to claim 1, wherein said pressurizing means comprises an inlet passage in fluid communication with the pressure chamber, and valve means in said inlet passage for permitting said fluid to be introduced into said pressure chamber and for preventing said introduced fluid from escaping from said pressure chamber through said inlet passage.

5. A self-adjusting bearing assembly according to claim 4 further comprising fitting means for introducing said fluid from said pressure chamber into an interface between the bearing surface of said ball member and the bearing surfaces of said seat members.

6. A self-adjusting bearing assembly according to claim 1, wherein said movable bearing seat member comprises fitting means for permitting said fluid to be introduced from said pressure chamber through said movable bearing seat member into an interface between the inner bearing surface of said movable bearing seat member and the outer bearing surface of said ball member when said fluid pressure in said pressure chamber is greater than a predetermined value.

7. A self-adjusting bearing assembly according to claim 6, wherein said fluid is a lubricating substance and a groove is formed in a portion of the inner bearing surface of said movable bearing seat member, wherein said fitting means is received in a passage formed in said movable bearing seat member, wherein the groove in said movable member bearing surface is in fluid communication with said movable member passage, and wherein said groove provides a channel for distributing said lubricating substance between said outer bearing surface of the ball member and said inner bearing surfaces of the bearing seat members.

8. A self-adjusting bearing assembly according to claim 7, wherein said movable bearing seat member is arranged to move in a direction of an axis of said bearing chamber, and wherein said lubricating groove forms a spiral shape extending around said axis.

9. A self-adjusting bearing assembly according to claim 1, wherein the other of said bearing seat members is fixed in position within said housing means, and said movable bearing seat member is slidable within the bearing chamber of said housing means in a movement direction; wherein the inner bearing surface of said movable bearing seat member is adjacent said ball member on a side of said ball member substantially opposite the inner bearing surface of said fixed bearing seat member; and wherein said movable and fixed bearing seat members are separated by a slot, said slot extending transversely to said movement direction to provide a space between said bearing seat members to allow said movable bearing seat member to move toward said fixed bearing seat member in response to the pressure of fluid in said pressure chamber and the wearing of said bearing surfaces.

10. A self-adjusting bearing assembly according to claim 1, wherein said housing means is provided by an end portion of an elongated component, wherein said connector member extends through an opening formed in a sidewall of said elongated component, wherein said movable bearing seat member is arranged to move in a direction of an axis of said bearing chamber, and wherein said bearing chamber axis is substantially perpendicular to a longitudinal axis of said elongated component.

11. A self-adjusting bearing assembly according to claim 1, wherein said adjusting means further comprises cap means arranged to close the open end of said bearing chamber, and screw means having threads for engaging a threaded opening in said cap means and an inner end arranged to exert a force on the pressure surface of said movable bearing seat member in response to rotation of said screw means while in said threaded engagement with said cap means, said force causing said movable bearing seat member to be forced against said ball member and the amount of said force being adjustable by said rotation of the screw means.

12. A self-adjusting bearing assembly according to claim 1 further comprising valve means for preventing fluid pressure in said pressure chamber from exceeding a predetermined value.

13. A self-adjusting bearing assembly, comprising:

bearing means comprising a ball member and a connector member, said ball member having an outer bearing surface extending about at least a central portion of the ball member;

housing means defining a bearing chamber having an open end;

bearing seat means comprising at least two opposing bearing seat members arranged in said bearing chamber to define therebetween a space for receiving said ball member, each of said bearing seat members having an inner bearing surface conforming substantially to the shape of the outer bearing surface of said ball member and arranged to engage the outer bearing surface of said ball member while allowing said ball member to rotate, at least one of said bearing seat members being movable in said bearing seat chamber, and said connector member extending through a passage formed at least in part by said housing mean; and adjusting means for urging said movable bearing seat member toward said ball member such that the inner bearing surfaces of said seat members engage the outer bearing surface of said ball member, said adjusting means comprising cap means arranged to close the open end of said bearing chamber, and screw means having threads for engaging a threaded opening in said cap means and an inner end arranged to apply pressure to a pressure surface of said movable bearing seat member in response to rotation of said screw means while in said threaded engagement with said cap means, said pressure surface being on a side of said movable bearing seat member opposite from said ball member, and said movable bearing seat member being arranged to be forced against said ball member by said pressure, the amount of said pressure being adjustable by said rotation of the screw means.

14. A self-adjusting bearing assembly, comprising:

a ball member fixed to a connector member, said ball member having an outer bearing surface extending about at least a central portion of the ball member;

a housing defining a bearing chamber having an open end;

two opposing bearing seat members arranged in said bearing chamber to define therebetween a space for receiving said ball member, each of said bearing seat members having an inner bearing surface conforming substantially to the shape of the outer bearing surface of said ball member and arranged to engage the outer bearing surface of said ball member while allowing said ball member to rotate, at least one of said bearing seat members being movable in said bearing chamber, and said connector member extending through a passage formed at least in part by said housing;

a resilient diaphram arranged to cover and seal the open end of said bearing chamber;

a pressure chamber in fluid communication with a first surface of said diaphram; and, a fitting in fluid communication with said pressure chamber and comprising a valve for pressurizing said pressure chamber with a pressurized fluid, a second surface of said diaphram opposite to said first surface being arranged to apply pressure to a pressure surface of said movable bearing seat member in response to said chamber pressure, said pressure surface being on a side of said movable bearing seat member opposite from said ball member, and said at least one movable bearing seat member being arranged to be urged toward said ball member by said diaphram such that the inner bearing surfaces of said seat members engage the outer bearing surface of said ball member in response to said chamber pressure.

15. A self-adjusting bearing assembly according to claim 14, wherein said pressure chamber is provided by a closure cap arranged on said housing adjacent to the open end of said bearing chamber, wherein said fitting is received in an inlet passage formed in said closure cap, and said valve is a check valve permitting said fluid to be introduced into said pressure chamber while preventing said introduced fluid from escaping from said pressure chamber through said inlet passage.

16. A self-adjusting bearing assembly according to claim 15, wherein a peripheral portion of said closure cap is secured to an end portion of said housing member, and wherein a rib extending around a peripheral portion of said diaphram is held in sealing engagement with a groove in said housing end portion by said closure cap peripheral portion.

17. A self-adjusting bearing assembly according to claim 14 further comprising a second fitting for permitting said fluid to be introduced from said pressure chamber through said movable bearing seat member into an interface between the inner bearing surface of said movable bearing seat member and the outer bearing surface of said ball member when said chamber pressure is greater than a predetermined value.

18. A self-adjusting bearing assembly according to claim 17, wherein said fluid is a lubricating substance and a groove is formed in a portion of the inner bearing surface of said movable bearing seat member, wherein said second fitting is received in a passage formed in said movable bearing seat member, wherein the groove in said movable member bearing surface is in fluid communication with said movable member passage, and wherein said groove provides a channel for distributing said lubricating substance between said outer bearing surface of the ball member and said inner bearing surfaces of the bearing seat members.

19. A self-adjusting bearing assembly according to claim 14, wherein the other of said bearing seat members is fixed in position within said housing, and said movable bearing seat member is slidable within the bearing chamber of said housing in a movement direction; wherein the inner bearing surface of said movable bearing seat member is adjacent said ball member on a side of said ball member substantially opposite the inner bearing surface of said fixed bearing seat member; and wherein said movable and fixed bearing seat members are separated by a slot, said slot extending transversely to said movement direction to provide a space between said bearing seat members to allow said movable bearing seat member to move toward said fixed bearing seat member in response to said chamber pressure and the wearing of said bearing surfaces.

20. A self-adjusting bearing assembly according to claim 14, wherein said housing is provided by an end portion of a tie rod component of a vehicle steering assembly, and said connector member extends through an opening formed in a sidewall of said tie rod end portion; wherein said movable bearing seat member is arranged to move in a direction of an axis of said bearing chamber; wherein said bearing chamber axis is substantially perpendicular to a longitudinal axis of said tie rod component; and wherein said connector member includes a connector element for connecting a distal end portion thereof to another component of said steering assembly.

21. A self-adjusting bearing assembly, comprising:

bearing means comprising a ball member and a connector member, said ball member having an outer bearing surface extending about at least a central portion of the ball member;

housing means defining a bearing chamber having an open end;

bearing seat means comprising at least two opposing seat members arranged in said bearing chamber to define therebetween a space for receiving said ball chamber, each of said seat members having in inner bearing surface conforming substantially to the shape of the outer bearing surface of said ball member and arranged to engage the outer bearing surface of said ball member while allowing said ball member to rotate, at least one of said seat members being movable in said bearing seat chamber, and said connector member extending through a passage formed at least in part by said housing means; and adjusting means for urging said movable seat member toward said ball member such that the inner bearing surfaces of said seat members engage the outer bearing surface of said ball member, said adjusting means comprising cap means arranged to close the open end of said bearing chamber, a resilient diaphragm cooperating with said cap means and said movable seat member to provide a pressure chamber for applying a biasing force to a pressure surface of said movable seat member in response to fluid pressure in said pressure chamber, and means for pressurizing said pressure chamber with a fluid, said pressure surface being on a side of said movable seat member opposite from said ball member, and said movable seat member being arranged to be forced against said ball member by said biasing force.

22. A self-adjusting bearing assembly according to claim 21 wherein said adjusting means further comprises screw means having threads for engaging a threaded opening in said cap means and an inner end arranged to exert a mechanical force on the pressure surface of said movable seat member in response to rotation of said screw means while in said threaded engagement with said cap means, said mechanical force causing said movable bearing seat member to be forced against said ball member and the amount of said mechanical force being adjustable by said rotation of the screw means.

23. A self-adjusting bearing assembly according to claim 21 wherein said resilient diaphragm cooperates with said cap means to close and seal the open end of said bearing chamber.

24. A self-adjusting bearing assembly according to claim 23 wherein said pressure chamber is in fluid communication with a first surface of said diaphragm, and a second surface of said diaphragm opposite to said first surface is arranged to apply said biasing force to the pressure surface of said movable seat member in response to said chamber pressure.

25. A self-adjusting bearing assembly according to claim 21 wherein:

said housing means is provided by an end portion of an elongated component, said connector member extends through an opening formed in a sidewall of said elongated component, said movable seat member is arranged to move in a direction of an axis of said bearing chamber, and said bearing chamber axis is substantially perpendicular to a longitudinal axis of said elongated component.

* * * * *